No. 649,473. Patented May 15, 1900.
E. C. PALMER, Dec'd.
E. M. PALMER, Executrix.
METHOD OF MAKING WELDED JOINTS.
(Application filed May 14, 1898.)
(No Model.) 2 Sheets—Sheet I.
—FIG. I—
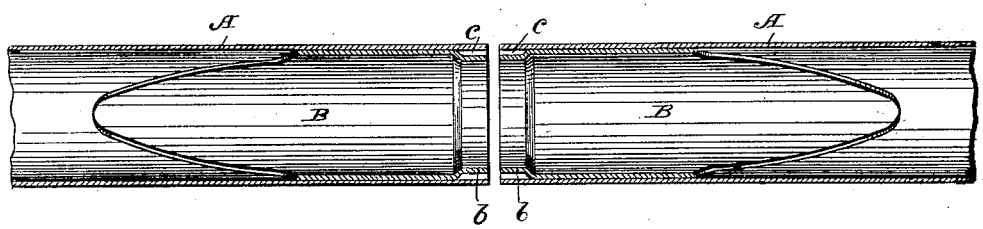
—FIG. II—
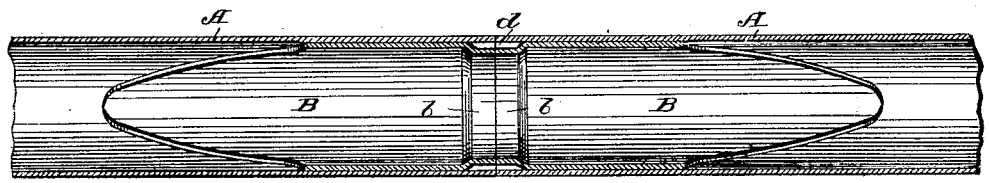
—FIG. III—
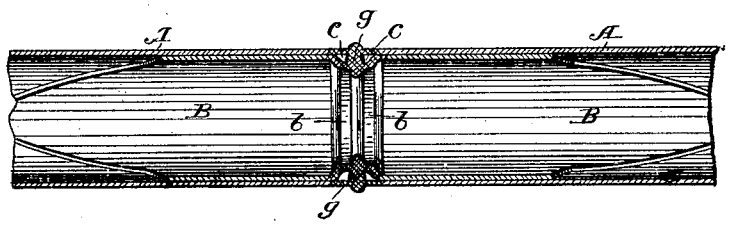
—FIG. IV—
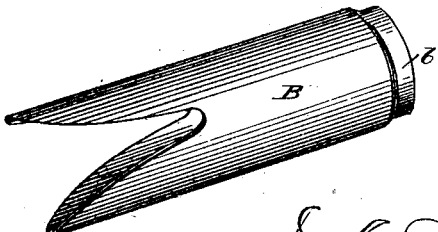
WITNESSES:
J. C. Turner
D. T. Davies
INVENTOR
E. C. Palmer
BY Thos. B. Hall
ATTORNEY.
THE NORRIS PETERS CO., PHOTO-LITHO., WASHINGTON, D. C.

No. 649,473. Patented May 15, 1900.
E. C. PALMER, Dec'd.
E. M. PALMER, Executrix.
METHOD OF MAKING WELDED JOINTS.
(Application filed May 14, 1898.)
(No Model.) 2 Sheets—Sheet 2.
- FIG. V -
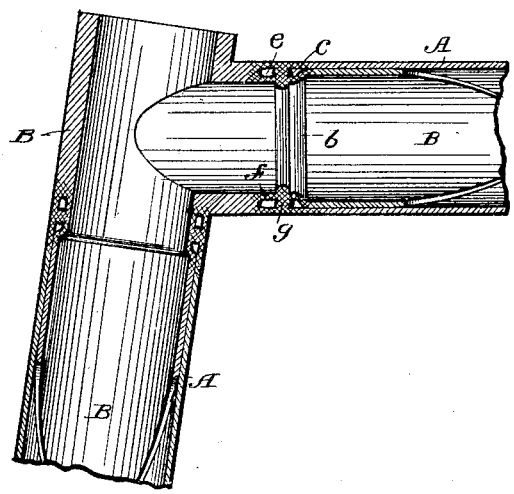
- FIG. VI -
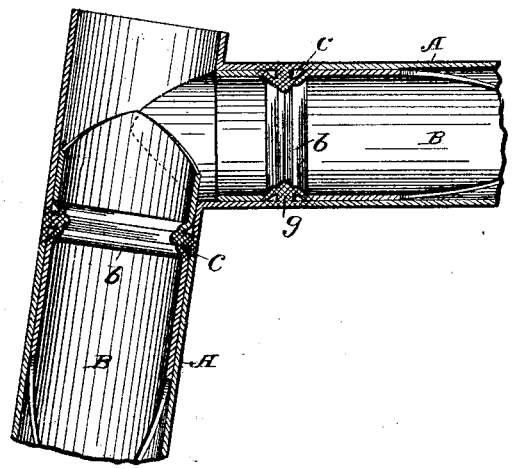
WITNESSES:
J. C. Turner
D. T. Davies
INVENTOR
E. C. Palmer
BY Thos. B. Hall
ATTORNEY.

UNITED STATES PATENT OFFICE.

EDWIN C. PALMER, OF CLEVELAND, OHIO; ELLA M. PALMER, EXECUTRIX OF SAID EDWIN C. PALMER, DECEASED, ASSIGNOR, BY MESNE ASSIGNMENTS, TO THE STANDARD WELDING COMPANY, OF SAME PLACE.

METHOD OF MAKING WELDED JOINTS.

SPECIFICATION forming part of Letters Patent No. 649,473, dated May 15, 1900.

Application filed May 14, 1898. Serial No. 680,727. (No specimens.)

*To all whom it may concern:*

Be it known that I, EDWIN C. PALMER, a citizen of the United States, and a resident of Cleveland, county of Cuyahoga, and State of Ohio, have invented a new and useful Improvement in Methods of Forming Joints, of which the following is a specification, the principle of the invention being herein explained, and the best mode in which I have contemplated applying that principle so as to distinguish it from other inventions.

The object of this invention is to provide an improvement in methods of forming joints. Such invention consists of the means hereinafter described, and particularly pointed out in the claims.

In the drawings, Figure I is a longitudinal sectional view of two members to be joined. Fig. II is a similar view of said two members in contact. Fig. III is a similar view of said two members joined according to the invention. Fig. IV is a perspective view of a reinforcement-section. Fig. V is a longitudinal sectional view of a bicycle-frame "fitting" which has its two angular arms respectively joined to corresponding bicycle-frame tubes according to a modification of the invention. Fig. VI is a longitudinal sectional view of a bicycle-frame fitting, which has its two angular arms respectively joined to corresponding bicycle-frame tubes according to the same form of the invention which is illustrated in the figures preceding Fig. V.

Describing first the manner of joining the two members shown in the first three figures of the drawings, each of the two tubes A is provided with a reinforcement-section B, such section being driven or otherwise made fast in the tube, with its joining end flush with the joining end of its tube, such section being shaped at its outer end with a contracted portion *b*, whereby a clear annular space *c* is formed between the tube and the reinforcement-section at their end portions. Each of the two members which are to be joined according to the invention is thus provided with said opening *c*, while each reinforcement-section is electrically connected with its tube and in contact therewith. The joint portions of said two members are then brought close together, the opposing ends of the two tubes being relatively placed in contact and the opposing ends of the two reinforcement-sections being relatively placed in contact, as shown in Fig. II, the two clear annular spaces *c* of Fig. I thus contributing to form one inclosed annular clear space *d* between the tubes and the two-part reinforcement, Fig. II. A suitable electric current is then passed through the tube ends and the reinforcement-section ends and across their contact-points, and the material at and adjacent to such ends is brought thereby to a welding heat. Pressure is then exerted longitudinally in opposite directions on the tubes, and hence upon this heated material. This pressure so exerted forces the said heated metal to flow across and also laterally from the two-part joint and to weld together. The metal flowing outwardly from the reinforcement-joint and the metal flowing inwardly from the tube-joint flow together into the annular space *d* and there unite, thus making the ends of the reinforcement-sections and the ends of the tubes to be solidly united in one common weld *g*, as shown in Fig. III. The metal flowing outwardly from the tube-joint may then be turned or filed off or otherwise removed, so as to form a smooth outer surface for the joint.

While for better understanding of the invention the latter is thus first described as applied to a joint which unites two tubes, yet it should not thereby be assumed that such application of the invention has any prominence over or is even so prominent as certain other applications of the invention. At present the invention is being most prominently applied to the fittings of a bicycle-frame, whether such fittings be either forgings or stampings. In Fig. V the invention is illustrated as applied to a bicycle-frame forging, and by a modified form of application. According to same but one reinforcement-section B is used at either of the two joints to be formed, the joining end of either angular arm of such forging being provided, before being placed in contact with its joining-tube A, with a clear space *e* concentric with such arm, and centrally located between the inner and outer cylindrical wall-surfaces of such arm. When the tube A, with its reinforcement-section B rigid therein, is placed in contact with such clear-spaced joining end of the arm of the forging, the joining end of the reinforcement-section comes into contact with the inner wall $f$ of said clear space $e$, and upon passage of electric current between such tube and the arm of the forging and the pressure of said two members together the welding follows with result as is shown in said Fig. V, while Fig. VI shows a bicycle-frame stamping having its two angular arms respectively joined to corresponding bicycle-frame tubes, either joint employing a two-part reinforcement, similarly as shown and described for the joint shown in the first three figures of the drawings. A joint of great strength and durability is thus formed, wherein also the reinforcement is incapable of displacement and increased thickness of metal is provided at the joint. Further, there is very little liability of the occurrence of flaws in the welds, inasmuch as the metal that flows into said clear space is more or less compressed, expelling all air which might otherwise form in small bubbles in such metal and making a homogeneous weld, the joining-walls and the reinforcement being united in a weld common to them all and occupying space between them about such weld, said weld being of most desirable quality of the metal.

Other modes of applying the principle of the invention may be employed instead of the one explained, change being made as regards the mechanism herein disclosed, provided the means covered by either of the following claims be employed.

The following is therefore particularly pointed out and distinctly claimed as the invention:

1. A method of making a joint, consisting in providing a joining-wall with a reinforcement-section that forms a clear space between their end portions, welding such ends and another joining-wall together with their metal flowing into said space and there uniting, substantially as set forth.

2. A method of making a tube-joint, consisting in providing each of two tubes with a reinforcement-section that forms a clear annular space between the end portions of such tube and section, bringing the two tubes into end contact and their two reinforcement-sections into end contact to form an inclosed annular clear space between such four members, welding the latter together with their metal flowing into said space and there uniting in a common welded joint, substantially as set forth.

Signed by me this 11th day of May, 1898.

EDWIN C. PALMER.

Attest:
  THOS. B. HALL,
  D. T. DAVIES.